United States Patent
Shimada et al.

(10) Patent No.: US 12,436,354 B2
(45) Date of Patent: Oct. 7, 2025

(54) OPTICAL MODULE AND METHOD OF MANUFACTURING OPTICAL MODULE

(71) Applicant: SUMITOMO ELECTRIC INDUSTRIES, LTD., Osaka (JP)

(72) Inventors: Kensaku Shimada, Osaka (JP); Takeshi Inoue, Osaka (JP); Taisuke Nagasaki, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 335 days.

(21) Appl. No.: 18/221,178

(22) Filed: Jul. 12, 2023

(65) Prior Publication Data
US 2024/0045166 A1 Feb. 8, 2024

(30) Foreign Application Priority Data
Aug. 4, 2022 (JP) ................. 2022-124893

(51) Int. Cl.
| | |
|---|---|
| *G02B 6/42* | (2006.01) |
| *B32B 15/04* | (2006.01) |
| *G02B 1/14* | (2015.01) |
| *G02B 7/00* | (2021.01) |
| *G02B 27/00* | (2006.01) |

(52) U.S. Cl.
CPC ............ *G02B 7/003* (2013.01); *B32B 15/043* (2013.01); *G02B 1/14* (2015.01); *G02B 27/0012* (2013.01)

(58) Field of Classification Search
CPC ...... G02B 7/003; G02B 1/14; G02B 27/0012; G02B 6/4244; G02B 6/4221; B32B 15/043; B32B 2255/06; B32B 2255/205; B32B 15/01; B32B 15/018
See application file for complete search history.

(56) References Cited

U.S. PATENT DOCUMENTS

| | | | |
|---|---|---|---|
| 2009/0110354 A1* | 4/2009 | Sutherland | ............ G02B 6/423 438/31 |
| 2019/0129106 A1 | 5/2019 | Inoue et al. | |
| 2022/0283388 A1 | 9/2022 | Nagasaki et al. | |

FOREIGN PATENT DOCUMENTS

| | | |
|---|---|---|
| JP | 2019-082508 A | 5/2019 |
| WO | 2013/099700 A1 | 7/2013 |

\* cited by examiner

*Primary Examiner* — Jamara A Franklin
(74) *Attorney, Agent, or Firm* — Oliff PLC

(57) ABSTRACT

An optical module includes an optical component, a substrate including a main surface, a mount portion provided on the main surface of the substrate, and at least one measurement reference portion provided on the main surface of the substrate at a position apart from the mount portion. The substrate mounts the optical component thereon. The mount portion is configured to mount the optical component thereon. The measurement reference portion includes a reference point that becomes a height reference when measuring a mount height of the optical component.

16 Claims, 7 Drawing Sheets

OPTICAL MODULE AND METHOD OF MANUFACTURING OPTICAL MODULE

CROSS REFERENCE TO RELATED APPLICATIONS

This application claims the benefit of priority from Japanese Patent Application No. 2022-124893, filed on Aug. 4, 2022, the entire contents of which are incorporated herein by reference.

TECHNICAL FIELD

The present disclosure relates to an optical module and a method of manufacturing an optical module.

BACKGROUND

JP2019-082508A discloses an optical component including a substrate to which photoelectric conversion elements are attached and a lens component disposed on the substrate.

SUMMARY

An optical module according to one aspect of the present disclosure includes an optical component, a substrate including a main surface, a mount portion provided on the main surface of the substrate, and at least one measurement reference portion provided on the main surface of the substrate at a position apart from the mount portion. The substrate mounts the optical component thereon. The mount portion is configured to mount the optical component thereon. The measurement reference portion includes a reference point that becomes a height reference when measuring a mount height of the optical component.

DETAILED DESCRIPTION

Figure 1:
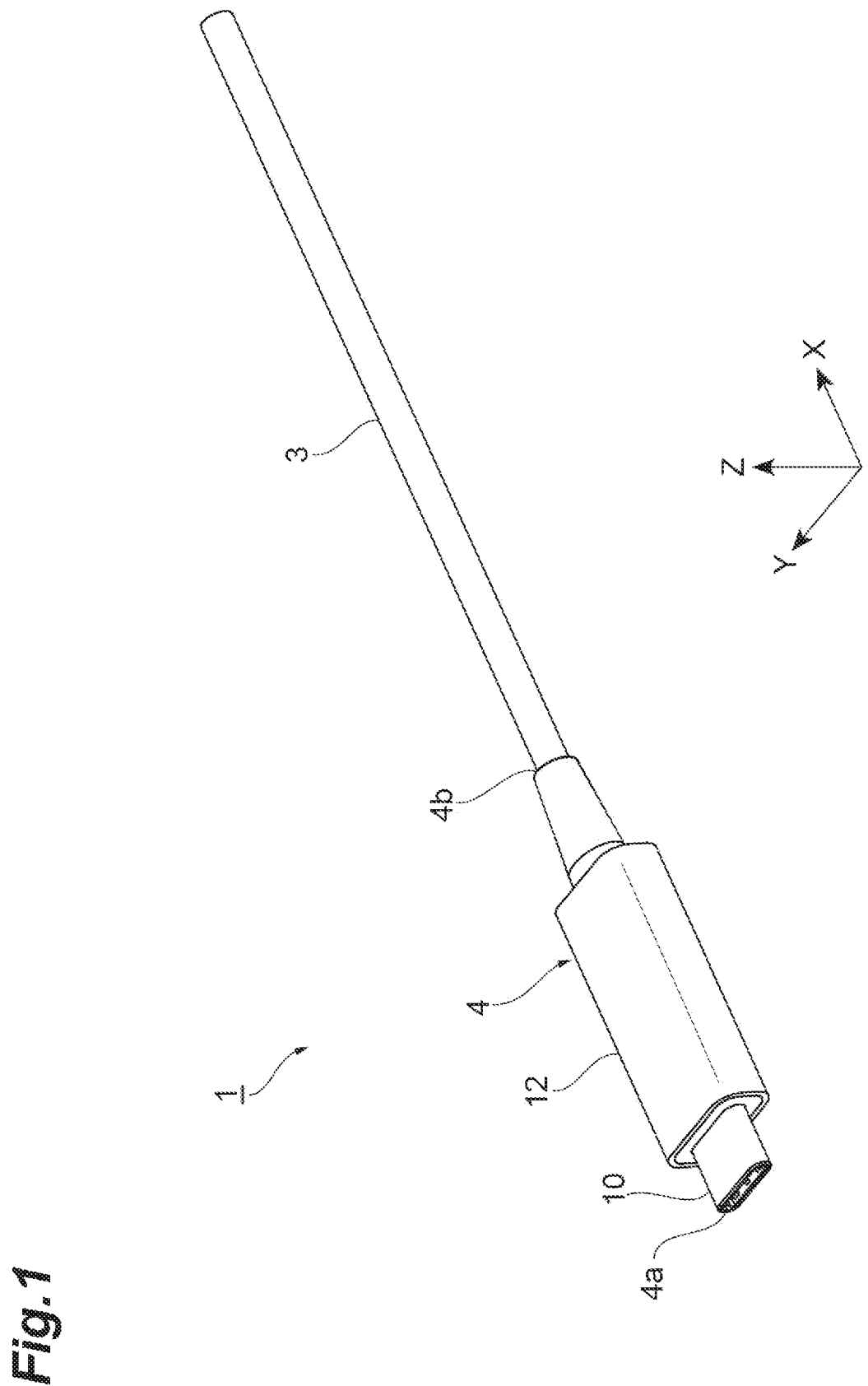
FIG. 1 is a perspective view of an optical module according to an embodiment.

Problems to be Solved by the Present Disclosure

In the optical module described in JP2019-082508A, an optical component such as a lens component is mounted on a substrate so as to cover photoelectric conversion elements. Since the optical component is optically connected to another optical module, it is necessary to adjust the height position and inclination of the optical component with high accuracy when the optical component is mounted. The height position and the inclination of the optical component are adjusted with reference to an upper surface portion of the substrate, and thus it is conceivable to use a mounting region (formed by gold plating, for example) of the optical component having a uniform thickness in the upper surface portion of the substrate as a reference point. However, if the mounting region is used as the reference point, the mounting region cannot be used as the reference point after the optical component is disposed on the substrate. Thus, it is difficult to adjust the height position and the inclination of the optical component with high accuracy. For this reason, the mounting accuracy of the optical component is not sufficient in the optical module, and connection loss may increase when the optical module is connected to another optical module.

Effects of the Present Disclosure

According to the present disclosure, increase in connection loss of an optical module can be suppressed.

Description of Embodiments of the Present Disclosure

First, the contents of embodiments of the present disclosure will be listed and explained.

[1] An optical module according to one aspect of the present disclosure includes an optical component, a substrate including a main surface, a mount portion provided on the main surface of the substrate, and at least one measurement reference portion provided on the main surface of the substrate at a position apart from the mount portion. The substrate mounts the optical component thereon. The mount portion is configured to mount the optical component thereon. The measurement reference portion includes a reference point that becomes a height reference when measuring a mount height of the optical component.

In the optical module of [1], the measurement reference portion including the reference point that becomes the height reference when measuring the mount height of the optical component, is provided on the main surface of the substrate, aside from the mount portion on which the optical component is mounted. In this embodiment, when the optical component is disposed on the substrate, the height position of the optical component can be adjusted with high accuracy using the measurement reference portion, so that the optical module with high mounting accuracy can be obtained. According to the optical module, it is possible to suppress an increase in connection loss when the optical component is connected to another optical component.

[2] In the optical module according to [1], the mount portion may include a mount surface that mounts the optical component thereon, and the measurement reference portion may include a reference surface including the reference point. The mount surface and the reference surface may have a predetermined positional relationship in a thickness direction of the substrate. In this embodiment, since the mount surface and the reference surface have a predetermined positional relationship (for example, a height relationship), the mount height of the optical component mounted on the mount surface can be adjusted with high accuracy with reference to the reference point included in the reference surface. According to the optical module, it is possible to more reliably suppress an increase in connection loss.

[3] In the optical module according to [2], the mount surface and the reference surface may have a positional relationship in which the mount surface and the reference surface have a same height in the thickness direction of the substrate. In this embodiment, the mount height of the optical component mounted on the mount surface can be adjusted with high accuracy with reference to the reference point included in the reference surface, without considering difference in height between the mount surface and the reference surface in the thickness direction of the substrate. According to the optical module, it is possible to more reliably suppress an increase in connection loss. The expression "the mount surface and the reference surface have a same height" used herein means that, when the thickness of the mount portion or the measurement reference portion is 100%, the difference between the height of the mount surface and the height of the reference surface in the thickness direction of the substrate is within 5%.

[4] In the optical module according to [2] or [3], the mount portion may include a first metal foil layer formed on the main surface of the substrate, and a first metal plating layer formed on the first metal foil layer. The measurement reference portion may have a second metal foil layer formed on the main surface of the substrate, and a second metal plating layer formed on the second metal foil layer. A surface of the first metal plating layer may include the mount surface, and a surface of the second metal plating layer may include the reference surface. In this embodiment, it is possible to more reliably and accurately adjust the thickness of the mount portion and the thickness of the measurement reference portion, and to adjust the mount height of the optical component mounted on the mount portion with high accuracy with reference to the measurement reference portion. According to the optical module, it is possible to more reliably suppress an increase in connection loss,

[5] In the optical module according to any one of [1] to [4], the at least one measurement reference portion may include a plurality of measurement reference portions. The plurality of measurement reference portions may be disposed on the main surface of the substrate so as to surround the mount portion. In this embodiment, since the plurality of measurement reference portions are provided so as to surround the mount portion, not only the height position of the optical component but also the inclination thereof can be adjusted with high accuracy even after the optical component is disposed on the substrate. Thus, an optical module with higher mounting accuracy can be obtained. According to the optical module, it is possible to further suppress an increase in connection loss.

[6] In the optical module according to any one of [1] to [5], the optical module may further include a solder resist layer formed on the main surface of the substrate so as to fill a space between the mount portion and the measurement reference portion. A groove separating the mount portion and the measurement reference portion may be formed in the solder resist layer. In this embodiment, when the optical component disposed on the mount portion is fixed using an adhesive, an excess adhesive flows into the groove, and thus the excess adhesive can be prevented from reaching the measurement reference portion. Therefore, the mount height of the optical component mounted on the mount portion can be more reliably adjusted with high accuracy with reference to the measurement reference portion. According to the optical module, it is possible to more reliably suppress an increase in connection loss.

[7] in the optical module according to any one of [1] to [6], the measurement reference portion may have a circular shape when the measurement reference portion is viewed from a direction perpendicular to the main surface of the substrate, and the groove may be formed so as to surround the measurement reference portion. In this embodiment, when the mount height of the optical component is adjusted using a laser measuring device that emits a circular laser beam, it is easy to bring the area of the measurement reference portion close to the cross-sectional area of the laser beam. According to this optical module, the measurement reference portion can be easily miniaturized, and thus it is possible to miniaturize the entire module. In addition, the periphery of the measurement reference portion is surrounded by the groove, and thus it is possible to more reliably prevent the adhesive from reaching the measurement reference portion. According to this optical module, it is possible to miniaturize the optical module while suppressing an increase in connection loss.

[8] In the optical module according to any one of [1] to [7], the optical component may include a plurality of light incoming/outgoing portions each having an optical axis extending in a first direction on a plane parallel to the main surface, and the plurality of light incoming/outgoing portions may be arranged along a second direction intersecting the first direction on the plane parallel to the main surface. In this embodiment, the optical component can be easily connected to another optical component so that an optical axis of another optical component extending in the first direction coincides with the optical axis of this optical component. According to the optical module, it is possible to easily suppress an increase in connection loss when the optical component is connected to another optical component.

[9] A method of manufacturing an optical module according to an embodiment of the present disclosure includes, preparing an optical component and a substrate, forming a mount portion to mount the optical component thereon, on a main surface of the substrate, forming at least one measurement reference portion on the main surface of the substrate at a position apart from the mount portion, the at least one measurement reference portion including a reference point that becomes a height reference when measuring a mount height of the optical component, and mounting the optical component on the mount portion and adjusting a height of the optical component with a height of the measurement reference portion being the height reference. In this embodiment, the height of the optical component can be adjusted by using the measurement reference portion provided aside from the mount portion on which the optical component is mounted. According to the method of manufacturing the optical module, the height position of the optical component can be adjusted with high accuracy when the optical component is disposed on the substrate, and the optical module with high mounting accuracy can be obtained.

[10] In the method of manufacturing an optical module according to [9], in the forming of the mount portion, a first metal foil layer may be formed on the main surface of the substrate and a first metal plating layer may be formed on the first metal foil layer. In the forming of the measurement reference portion, a second metal foil layer my be formed on the main surface of the substrate and a second metal plating layer may be formed on the second metal foil layer. The first metal foil layer and the second metal foil layer may be formed in a same process. The first metal plating layer and the second metal plating layer may be formed in a same process. In this embodiment, the mount portion and the measurement reference portion can be formed through the same processes, and it is easy to more reliably adjust the heights of the mount portion and the measurement reference portion to be the same. Thus, it is possible to more easily adjust the mount height of the optical component mounted on the mount portion.

Details of Embodiments of Present Disclosure

Specific examples of an optical module and a method of manufacturing the optical module according to the present disclosure will be described below with reference to the drawings. The present invention is not limited to these examples, but is defined by the scope of the claims, and is intended to include all modifications within the meaning and scope equivalent to the scope of the claims. In the description of the drawings, the same elements are denoted by the same reference numerals, and redundant description is omitted.

FIG. 1 is a perspective view of an optical module according to an embodiment. As shown in FIG. 1, an optical module 1 includes a cable 3 including a plurality of optical fibers 2 (see FIG. 2), and a connector module 4 attached to a distal end of cable 3. Connector module 4 is a connector extending along a longitudinal direction X (also referred to as an X direction), and has a front end 4a and a rear end 4b in the X direction. Rear end 4b is located on the opposite side of front end 4a in the X direction. Connector module 4 has an electrical connector at front end 4a, cable 3 is connected to rear end 4b, and optical fibers 2 of cable 3 are inserted into connector module 4 from rear end 4b. In the following description, a width direction of connector module 4 is referred to as a Y direction, and a height direction of connector module 4 is referred to as a Z direction. The Z direction is orthogonal to the X direction and the Y direction.

Figure 2:
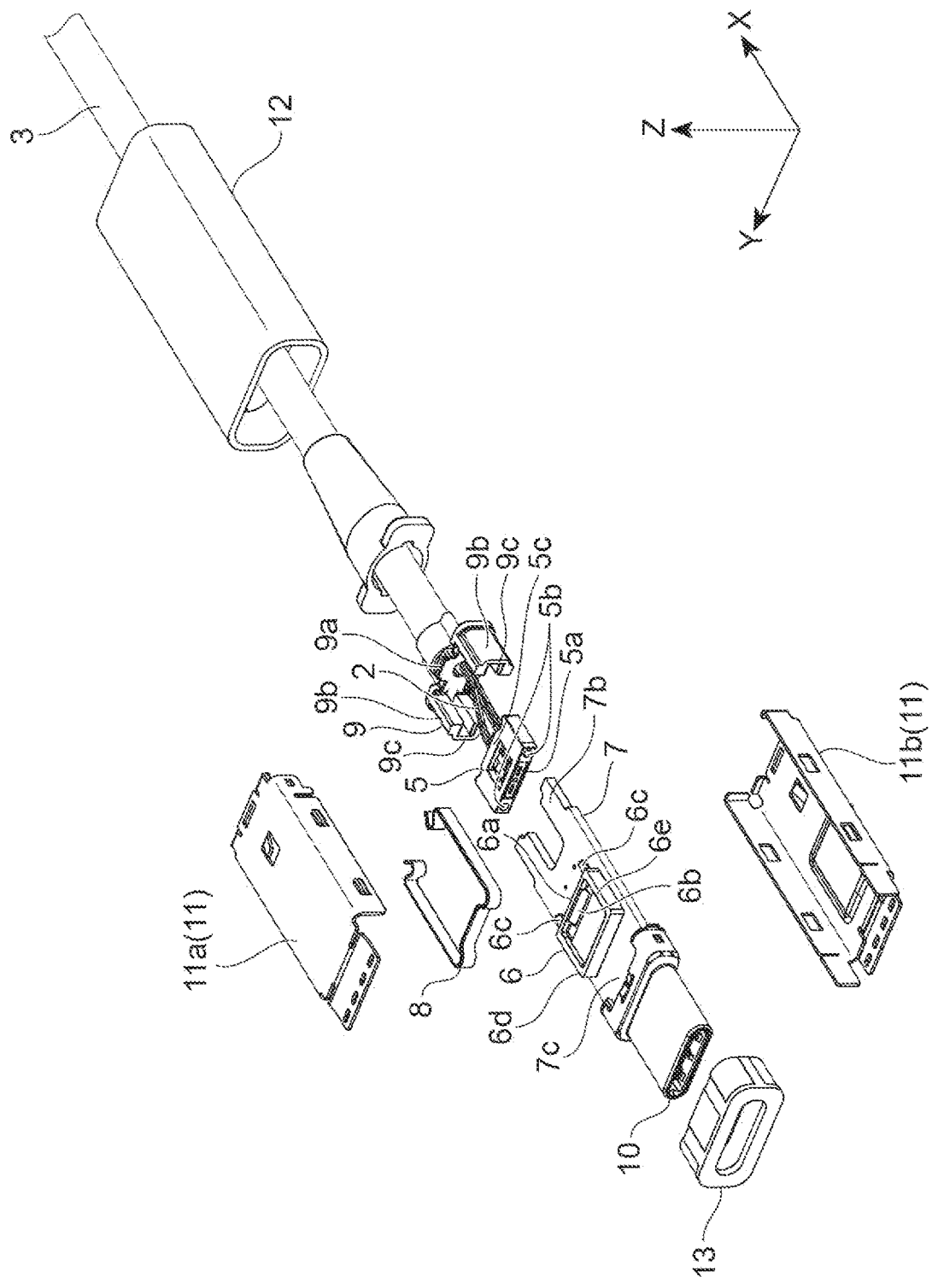
FIG. 2 is an exploded perspective view of the optical module shown in FIG. 1.

FIG. 2 is an exploded perspective view of optical module 1 shown in FIG. 1. As shown in FIGS. 1 and 2, connector module 4 of in optical module 1 includes a first lens module 5, a second lens module 6 (optical component), a substrate 7, a fitting spring 8, a metal member 9, a plug 10, a metal housing 11, a resin housing 12, and a front cap 13.

First lens module 5 is an optical component that holds the plurality of optical fibers 2 constituting cable 3 and is connectable to second lens module 6 along the X direction. First lens module 5 is a resin member having a substantially rectangular parallelepiped shape. First lens module 5 has a front end surface 5a perpendicular to the X direction and a pair of guide holes 5b. First lens module 5 is configured such that the tip of each optical fiber 2 of cable 3 inserted from the rear end surface (not shown) of first lens module 5 is exposed from front end surface 5a.

Guide holes 5b are positioning holes provided so as to sandwich the plurality of optical fibers 2 exposed on front end surface 5a, and extend in first lens module 5 along the X direction. When first lens module 5 is coupled to second lens module 6, a pair of guide pins 6c of second lens module 6 are inserted into the pair of guide holes 5b, thereby positioning first lens module 5 with respect to second lens module 6.

Second lens module 6 is an optical component configured to be optically coupled to each tip of the plurality of optical fibers 2 of cable 3 held by first lens module 5. Second lens module 6 is mounted by being fixed to substrate 7 by, for example, an adhesive. Second lens module 6 includes a plurality alight incoming/outgoing portions 6a (see also FIG. 3), a mirror surface 6b, and the pair of guide pins 6c. Each of the plurality of light incoming/outgoing portions 6a includes an optical axis extending in the X-direction on a plane parallel to a main surface 7a (see also FIG. 5) of substrate 7. The plurality of light incoming/outgoing portions 6a are arranged along the Y direction orthogonal to the X direction on a plane parallel to main surface 7a. The optical signal emitted from each of the plurality of optical fibers 2 is incident into second lens module 6 through the corresponding light incoming/outgoing portion 6a. When light-emitting devices (not shown) are provided on substrate 7, optical signals emitted from the light-emitting devices are emitted from the plurality of light incoming/outgoing portions 6a through mirror surface 6b and are incident on the tips of optical fibers 2 held by first lens module 5.

Mirror surface 6b is a reflection surface forming an angle of approximately 45 degrees with respect to the X direction and the Z direction. Mirror surface 6b is an optical structure for reflecting light emitted from optical fiber 2 held by first lens module 5 by 90 degrees toward light-receiving elements (not shown) provided on substrate 7. When light-emitting devices (not shown) are provided on substrate 7, mirror surface 6b reflects optical signals propagating in a vertical direction from each light-emitting device by 90 degrees toward optical fiber 2. By inserting the pair of guide pins 6c into the pair of guide holes 5b of first lens module 5, alignment in optical coupling between first lens module 5 and second lens module 6 is performed.

Substrate 7 is a member in which a metal wiring pattern (not shown) is formed on a surface of a dielectric substrate having a substantially rectangular flat plate shape. Substrate 7 is held by metal meal per 9. Main surface 7a (see also FIG. 5) of substrate 7 is provided with a mount portion 20, measurement reference portions 30, a solder resist layer 40, and grooves 50, which will be described later.

Fitting spring 8 is a member that maintains the connection state between first lens module 5 and second lens module 6 when first lens module 5 is connected to second lens module 6. Fitting spring 8 is configured to hold a rear end 5c of first lens module 5 and a rear end 6d of second lens module 6 and press them against each other to maintain the connection state.

Metal member 9 is connected to cable 3 and holds substrate 7. Metal member 9 includes a flat plate portion 9a extending in a direction perpendicular to the X direction and a pair of supporting portions 9b each extending from flat plate portion 9a in the X direction. An opening is formed in flat plate portion 9a, and optical fibers 2 are inserted into the opening. Each of the pair of supporting portions 9b is formed with a recessed portion 9c. Metal member 9 holds substrate 7 by fitting each rear end 7b of substrate 7 into each recessed portion 9c.

Plug 10 covers and protects a plurality of terminals (not shown) provided on a front end 7c of substrate 7, and is connected to a connector provided on another substrate (not shown). Plug 10 includes an insertion port which is located between rear end 4b and front end 4a in the X direction. Plug 10 is attached to substrate 7 by inserting front end 7c of substrate 7 from the insertion port of plug 10.

Metal housing 11 includes a housing upper portion 11a and a housing lower portion 11b. Second lens module 6 and substrate 7 are disposed and protected inside metal housing 11 constituted by housing upper portion 11a and housing lower portion 11b.

Front cap 13 is fitted to the opening on the front side of resin housing 12 to close the opening. Front cap 13 has a through hole corresponding to plug 10. By inserting plug 10 into the through hole of front cap 13, front cap 13 can be fitted to the opening on the front side of resin housing 12.

Figure 3:
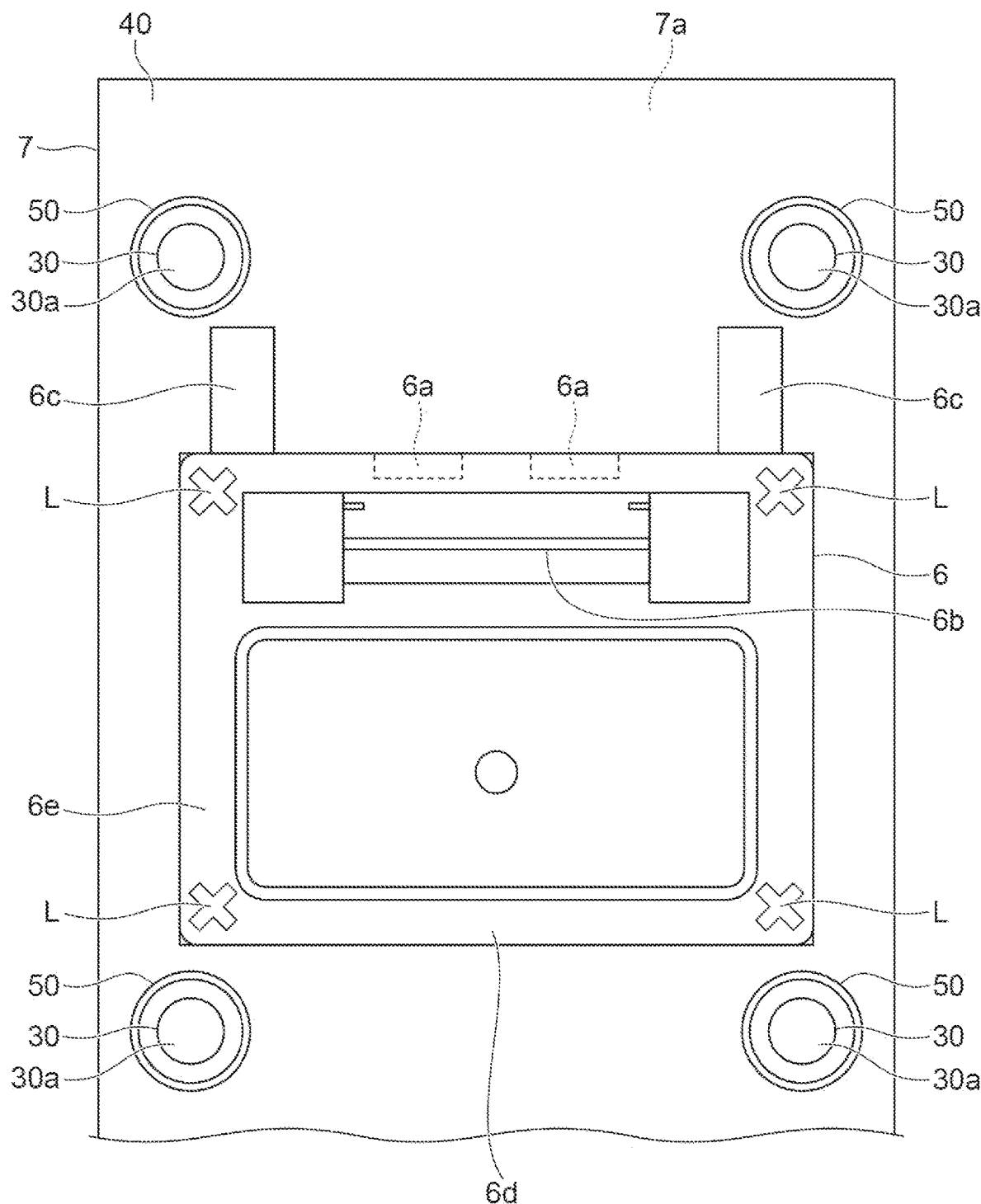
FIG. 3 is a top view of a substrate that mounts a second lens module thereon when viewed from above in an optical module.
Figure 4:
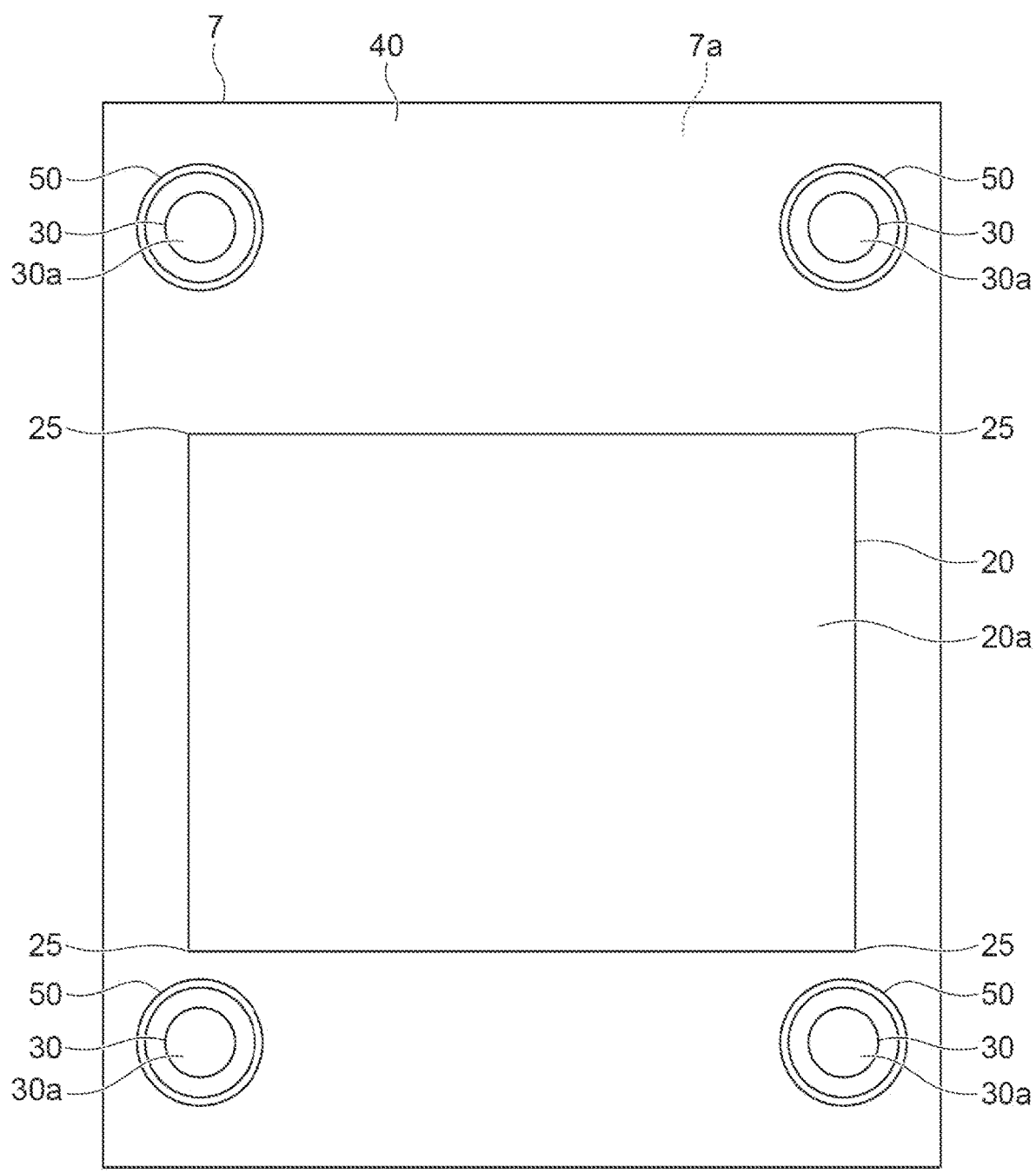
FIG. 4 is a top view of the substrate shown in FIG. 3 when viewed from above.
Figure 5:
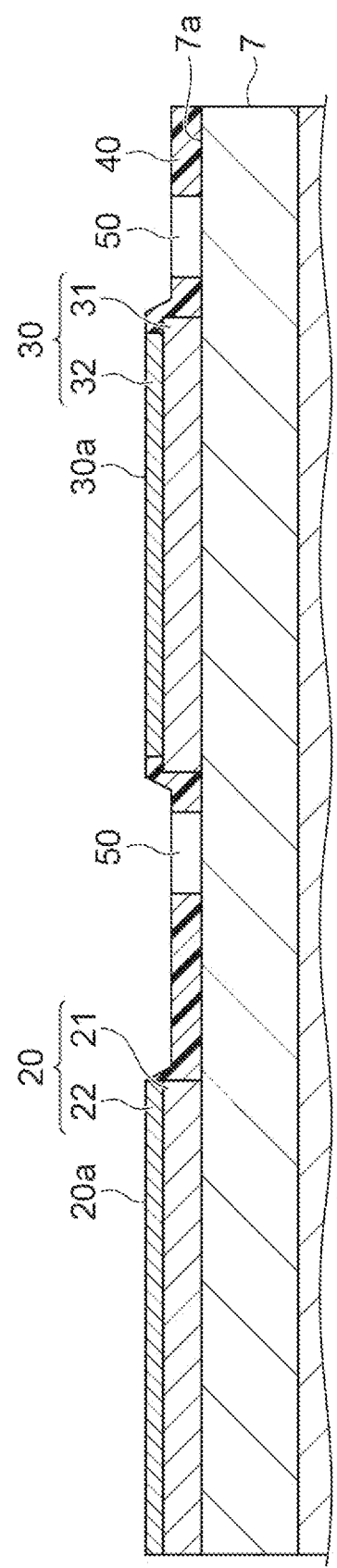
FIG. 5 is a cross-sectional view of the substrate shown in FIG. 4.

Next, second lens module 6 and substrate 7 in optical module 1 will be described in detail with reference to FIGS. 3, 4 and 5. FIG. 3 is a top view of substrate 7 on which second lens module 6 is mounted when viewed from above. FIG. 4 is a top view of substrate 7 when viewed from above. FIG. 5 is a cross-sectional view of substrate 7. As shown in FIG. 3, second lens module 6 is mounted on main surface 7a of substrate 7 in optical module 1. As shown in FIG. 4, main surface 7a of substrate 7 is provided with mount portion 20, a plurality of measurement reference portions 30, solder resist layer 40, and a plurality of grooves 50.

Mount portion 20 is a portion for mounting second lens module 6 thereon. As shown in FIGS. 4 and 5, mount portion 20 is provided on main surface 7a of substrate 7 and has a rectangular shape when viewed from a direction perpendicular to main surface 7a. Mount portion 20 includes a first metal foil layer 21 formed on main surface 7a of substrate 7 and a first metal plating layer 22 formed on first metal foil layer 21. First metal foil layer 21 is formed of a copper foil, for example, and first metal plating layer 22 is formed by gold plating, for example. A mount surface 20a of mount portion 20 (a surface of first metal plating layer 22) is provided with one or more light-receiving elements or one or more light-emitting devices (neither is shown). Mount surface 20a and the light-receiving element or the light-emitting device are electrically connected by a gold wire (not shown) or the like. That is, the light receiving element or the light-emitting device is electrically connected to the wiring pattern of substrate 7 through the gold wire, first metal plating layer 22, and first metal foil layer 21. Second lens module 6 mounted on mount surface 20a is fixed to mount surface 20a by an adhesive.

Each of the plurality of measurement reference portions 30 is a portion that becomes a reference when measuring the mount height of second lens module 6. As shown in FIGS. 4 and 5, each measurement reference portion 30 is provided at a position apart from mount portion 20 on main surface 7a of substrate 7. That is, measurement reference portions 30 are not overlapped with the mount portion 20 and second lens module 6. Measurement reference portion 30 may be apart from mount portion 20 by at least a linear distance of 1 mm, for example. The plurality of measurement reference portions 30 are provided, for example, at four positions on main surface 7a so as to surround mount portion 20. In addition, each measurement reference portion 30 can correspond to each corner 25 of mount portion 20 and locate adjacent to each corner 25. Measurement reference portion 30 can be formed so as to have a circular shape when viewed from a direction perpendicular to main surface 7a. For example, measurement reference portion 30 has a diameter of 100 μm to 1 mm.

As shown in FIG. 5, measurement reference portion 30 includes a second metal foil layer 31 formed on main surface 7a of substrate 7, and a second metal plating layer 32 formed on second metal foil layer 31. Second metal foil layer 31 is formed of, for example, copper foil, and second metal plating layer 32 is formed by, for example, gold plating. A reference surface 30a of measurement reference portion 30 (the surface of second metal plating layer 32) includes a reference point that becomes a height reference when measuring the mount height of second lens module 6. The mount height of second lens module 6 can be measured and adjusted using reference surface 30a according to the method of manufacturing described below.

As shown in FIG. 4, solder resist layer 40 is an insulating layer formed so as to fill a space between mount portion 20 and measurement reference portions 30 on main surface 7a of substrate 7. Solder resist layer 40 protects the wiring pattern of substrate 7 and can be formed of, for example, a photosensitive resin ink.

Each of the plurality of grooves 50 is a configuration for preventing an adhesive leaked when fixing second lens module 6 from reaching adjacent measurement reference portion 30. Each groove 50 is formed in solder resist layer 40 to separate mount portion 20 and measurement reference portion 30. Each groove 50 is formed at four positions of solder resist layer 40 so as to surround each of measurement reference portions 30 provided at four positions, for example. When viewed from a direction perpendicular to main surface 7a, each groove 50 has a circular shape concentric with the corresponding measurement reference portion 30. Groove 50 may not be concentric with measurement reference portion 30. As shown in FIG. 5, the depth of groove 50 in the thickness direction of substrate 7 is equal to the thickness of solder resist layer 40. The depth of groove 50 in the thickness direction of substrate 7 may be shorter than the thickness of solder resist layer 40. The width of groove 50 are not particularly limited as long as the leaked adhesive can be stopped, and may be, for example, 100 μm to 1 mm.

Here, the positional relationship between mount surface 20a of mount portion 20 and reference surface 30a of measurement reference portion 30 will be described with reference to FIGS. 4 and 5. Mount surface 20a and reference surface 30a are set so as to have a predetermined height relationship in the thickness direction (Z direction) of substrate 7, and in the example shown in FIG. 5, for example, have a positional relationship in which mount surface 20a and reference surface 30a have the same height. The expression "mount surface 20a and reference surface 30a have the same height" as used herein means that when the thickness of mount portion 20 or measurement reference portion 30 is 100%, the difference between the height of mount surface 20a and the height of reference surface 30a in the thickness direction of substrate 7 is within 5%. By setting such a positional relationship in advance, it is possible to easily measure or adjust the mount height of second lens module 6 in the method of manufacturing to be described later. Mount surface 20a and reference surface 30a may have another predetermined positional relationship (a positional relationship in which mount surface 20a and reference surface 30a do not have the same height) in the thickness direction of substrate 7. For example, when the thickness of mount portion 20 or measurement reference portion 30 is set to 100%, the difference between the height of mount surface 20a and the height of reference surface 30a in the thickness direction of substrate 7 may be within a range of 10%.

Next, a method of manufacturing optical module 1 will be described. First, second lens module 6 and substrate 7 are prepared. Second lens 6 has a plurality of light incoming/outgoing portions 6a, mirror surface 6b, and a pair of guide pins 6c. Substrate 7 has a metal wiring pattern formed on a surface of a dielectric substrate having a substantially rectangular flat plate shape.

Subsequently, mount portion 20 for mounting second lens module 6 is formed on main surface 7a of substrate 7 (see FIGS. 4 and 5). In the step of forming mount portion 20, first metal foil layer 21 is formed on main surface 7a of substrate 7, and then first metal plating layer 22 is formed on the formed first metal foil layer 21. First metal foil layer 21 is formed of, for example, copper foil, and electroless gold plating using gold is performed on the copper foil to form first metal plating layer 22. First metal plating layer 22 is, for example, 1 μm to 10 μm, and is thinner than first metal foil layer 21. Mount portion 20 is formed to have a rectangular shape when viewed from a direction perpendicular to main surface 7a.

At least one measurement reference portion 30 including a reference point that becomes a height reference when measuring the mount height of second lens module 6 is formed on main surface 7a of substrate 7 and at a position apart from mount portion 20. In the step of forming measurement reference portion 30 according to the embodiment of the present disclosure, second metal foil layers 31 are formed at the four corners of main surface 7a so as to surround mount portion 20, and then second metal plating layers 32 are formed on the four formed second metal foil layers 31. Each second metal foil layer 31 is formed of, for example, a copper foil, and each second metal plating layer 32 is formed by performing electroless gold plating using gold on the copper foil. Second metal plating layer 32 has a thickness of, for example, 1 μm to 10 μm, and is thinner than second metal foil layer 31. Each of measurement reference portions 30 is formed to have a circular shape when viewed from a direction perpendicular to main surface 7a.

Mount portion 20 and measurement reference portions 30 described above may be formed in separate processes, but preferably, mount portion 20 and measurement reference portions 30 may be formed in the same process. In this method, first metal foil layer 21 and second metal foil layers 31 may be formed in the same process, and first metal plating layer 22 and second metal plating layers 32 may be formed in the same process (plating treatment). In this method, since mount portion 20 and measurement reference portions 30 are formed through the same processes, it is easy to more reliably adjust the height of mount portion 20 and the heights of measurement reference portions 30 to the same. In addition, in the formed mount portion 20 and measurement reference portions 30, mount surface 20a and reference surfaces 30a can easily have a positional relationship in which mount surface 20a and reference surfaces 30a have the same height in the thickness direction of substrate 7.

Subsequently, after mount portion 20 and measurement reference portions 30 are formed, solder resist layer 40 is formed on main surface 7a so as to fill a space between mount portion 20 and measurement reference portions 30. Solder resist layer 40 is formed, for example, by applying a photosensitive resin ink and exposing it to light.

Subsequently, solder resist layer 40 is etched to form grooves 50. For example, a laser processing method is used for etching solder resist layer 40. Alternatively, by forming solder resist layer 40 so that predetermined portions of main surface 7a of substrate 7 are exposed in the step of forming solder resist layer 40, each of the predetermined portions may form groove 50. Grooves 50 are formed at four positions of solder resist layer 40 so as to surround each of measurement reference portions 30 provided at the four corners. When viewed from a direction perpendicular to main surface 7a, each groove 50 is formed to have a circular shape concentric with the corresponding measurement reference portion 30. The depth of each groove 50 in the thickness direction of substrate 7 is equal to the thickness of solder resist layer 40. The depth of each groove 50 in the thickness direction of substrate 7 may be shorter than the thickness of solder resist layer 40.

Figure 6:
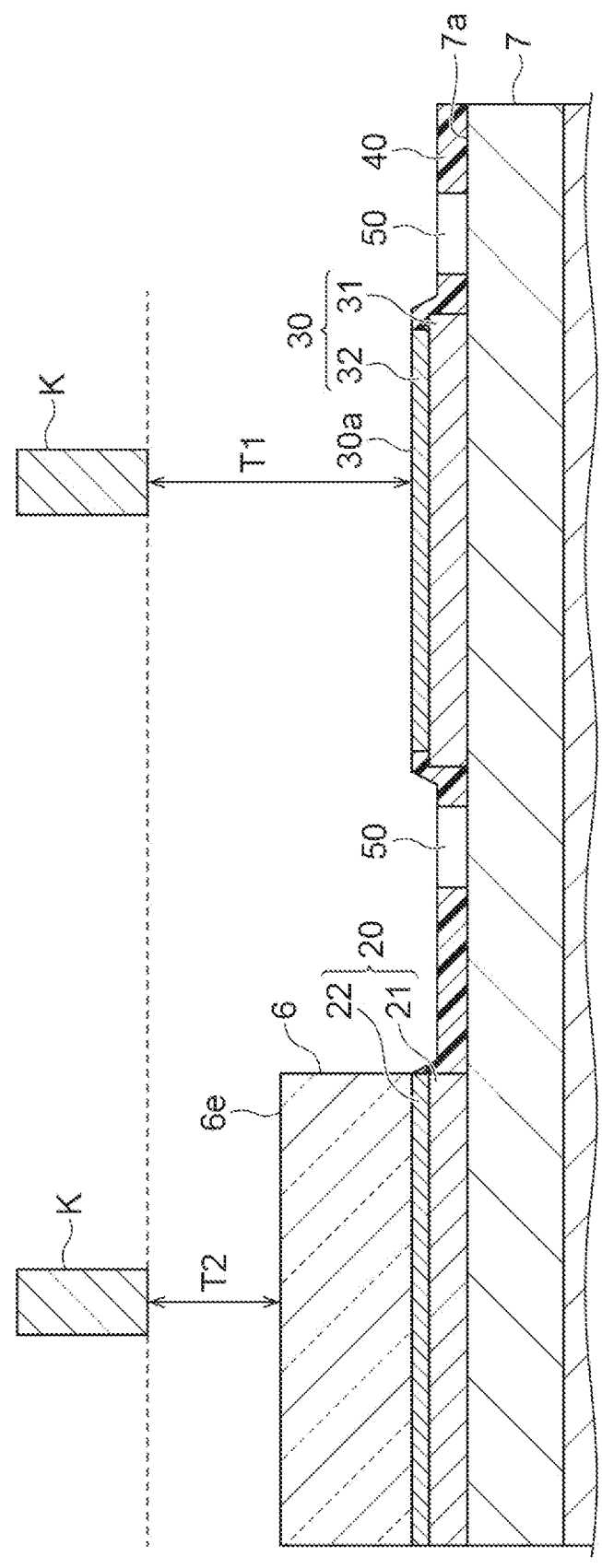
FIG. 6 is a cross-sectional view of adjusting a mount height of the second lens module in the optical module.

Subsequently, second lens module 6 is disposed on the formed mount portion 20, and the height of second lens module 6 is adjusted with reference to the height position of measurement reference portions 30. Here, a method of adjusting the mount height of second lens module 6 will be specifically described with reference to FIG. 6. FIG. 6 is a cross-sectional view when adjusting the mount height of second lens module 6 in optical module 1.

First, second lens module 6 is disposed at a predetermined position on mount portion 20. At this time, as shown in FIG. 3, second lens module 6 is disposed so that measurement reference portions 30 locate around four corners of second lens module 6. After this arrangement, a curable adhesive is applied between second lens module 6 and substrate 7, and temporarily cured to temporarily fix second lens module 6 to substrate 7. An adhesive may be applied in advance between second lens module 6 and mount portion 20, and the adhesive may be temporarily cured after the positioning in the planar direction is completed.

Next, as shown FIG. 6, a distance measuring instrument K is prepared. Distance measuring instrument K is disposed above measurement reference portion 30, and measures a distance T1 (referred to as distance T1) between distance measuring instrument K and measurement reference portion 30 (reference surface 30a). Distance measuring instrument K is, for example, a laser measuring instrument that emits a circular laser beam. At this method, distance measuring instrument K measures distance T1 in each of measurement reference portions 30 provided at the four corners. Distance measuring instrument K may calculate an average value of the measured distances T1 and hold measurement data, or may individually hold measurement data as distance T1 corresponding to each measurement reference portion 30. Distance measuring instrument K may hold the height corresponding to this distance T1 as "zero height".

Subsequently, after completing the measurement of distance T1, distance measuring instrument K is disposed above mount portion 20, and measures a distance T2 (also referred to as distance T2) between distance measuring instrument K and an upper surface 6e of second lens module 6. When measuring this distance T2, distance measuring instrument K measures each of distances (distances T2) at measurement points L (see FIG. 3) provided at four corners of upper surface 6e of second lens module 6. Distance measuring instrument K may calculate an average value of the measured distances T2 and hold the measurement data, or may individually hold the measurement data as distance T2 corresponding to each measurement point L.

Subsequently, distance measuring instrument K calculates a difference of T1–T2 between distance T1 and distance T2. In the embodiment of the present disclosure, mount surface 20a and reference surface 30a have a predetermined positional relationship, such as a positional relationship in which mount surface 20a and reference surfaces 30a have the same height in the thickness direction of substrate 7. Accordingly, the difference of T1–T2 between distance T1 and distance T2 is the mount height of second lens module 6. When distance T1 is set as the zero height, the measured distance T2 becomes the mount height of second lens module 6 as it is. When mount surface 20a and reference surface 30a have another predetermined positional relationship in the thickness direction of substrate 7, the mount height of second lens module 6 from mount portion 20 can be measured by adding or subtracting the difference in height between mount surface 20a and reference surface 30a in the thickness direction of substrate 7 to or from the difference of T1-T2 between distance T1 and distance T2. As described above, the mount height of second lens module 6 from mount portion 20 can be measured without measuring the distance between distance measuring instrument K and mount portion 20.

In addition, distance T1 between distance measuring instrument K and each of the plurality of measurement reference portions 30 is measured, and the inclination of main surface 7a of substrate 7 can be measured from the difference between the plurality of the measured distances T1. Further, distance measuring instrument K measures distance T2 between distance measuring instrument K and each of measurement points L (see FIG. 3) at the four corners of upper surface 6e of second lens module 6, and the inclination of upper surface 6e of second lens module 6 can be measured from the difference between the plurality of the measured distances T2. Alternatively, distance measuring instrument K may calculate the heights of the four corners of second lens module 6 from differences between distances T2 to measurement points L of the four corners of second lens module 6 and distances T1 to measurement reference portions 30 corresponding to (closest to) respective measurement points L. Then, the position, inclination, or the like of second lens module 6 may be adjusted so that the heights of the four corners coincide with each other.

Subsequently, after adjusting the mount height and the inclination of second lens module 6 with respect to substrate 7 to be within a predetermined range, the adhesive which has temporarily fixed second lens module 6 is further cured to fix second lens module 6 to substrate 7. Thereby, second lens module 6 is mounted on substrate 7.

Subsequently, as shown in FIG. 3, first lens module 5 holding the tip portions of the plurality of optical fibers 2 constituting cable 3 is connected to second lens module 6 mounted on substrate 7. Thereafter, fitting spring 8 is set so that the connected first lens module 5 and second lens module 6 are fitted into fitting spring 8, thereby maintaining the connection state between first lens module 5 and second lens module 6.

Subsequently, first lens module 5, second lens module 6, substrate 7, and the like are put between housing upper portion 11a and housing lower portion 11b, and substrate 7 and the like are disposed inside metal housing 11. Then, metal housing 11 is disposed inside resin housing 12, and front cap 13 is fitted into the opening of resin housing 12. By the above method of manufacturing, optical module 1 is obtained.

As described above, in optical nodule 1 according to the embodiment of the present disclosure, measurement reference portion 30 including the reference point that becomes the height reference when measuring the mount height of second lens module 6, is provided on main surface 7a of substrate 7, aside from mount portion 20 on which second lens module 6 is mounted. As a result, when second lens module 6 is mounted on substrate 7, the height position of second lens module 6 can be adjusted with high accuracy using measurement reference portion 30. Thus, optical module 1 with high mounting accuracy can be obtained. According to optical module 1, it is possible to suppress an increase in connection loss when second lens module 6 is connected to first lens module 5 (the plurality of optical fibers 2).

In optical module 1, mount portion 20 has mount surface 20a on which second lens module 6 is mounted, and measurement reference portion 30 has reference surface 30a including a reference point. Mount surface 20a and reference surface 30a have a predetermined positional relationship in the thickness direction of substrate 7. Since mount surface 20a and reference surface 30a have a predetermined positional relationship (fir example, a height relationship), the mount height of second lens module 6 mounted on mount surface 20a can be adjusted with high accuracy with reference to the reference point included in reference surface 30a. According to optical module 1, it is possible to more reliably suppress an increase in connection loss.

In optical module 1, mount surface 20a and reference surface 30a may have a positional relationship in which mount surface 20a and reference surface 30a have the same height in the thickness direction of substrate 7. In this configuration, the mount height of second lens module 6 mounted on mount surface 20a can be adjusted with high accuracy with reference to the reference point included in reference surface 30a without considering the difference in height between mount surface 20a and reference surface 30a in the thickness direction of substrate 7. According to optical module 1, it is possible to more reliably suppress an increase in connection loss.

In optical module 1, mount portion 20 includes first metal foil layer 21 formed on main surface 7a of substrate 7, and first metal plating layer 22 formed on first metal foil layer 21. Measurement reference portion 30 includes second metal foil layer 31 formed on main surface 7a of substrate 7, and second metal plating layer 32 formed on second metal foil layer 31. The surface of first metal plating layer 22 includes mount surface 20a, and the surface of second metal plating layer 32 includes reference surface 30a. With such a configuration, it is possible to more reliably and accurately adjust the thickness of mount portion 20 and the thickness of measurement reference portion 30, and to adjust the mount height of second lens module 6 mounted on mount portion 20 with high accuracy with reference to measurement reference portion 30. According to optical module 1, it is possible to more reliably suppress an increase in connection loss.

Optical module 1 can include a plurality of measurement reference portions 30, and the plurality of measurement reference portions 30 are disposed on main surface 7a of substrate 7 so as to surround mount portion 20. Thereby, after disposing second lens module 6 on substrate 7, not only the height position of second lens module 6 but also the inclination thereof can be adjusted with high accuracy. Thus, optical module 1 with higher mounting accuracy can be obtained. According to optical module 1, it is possible to further suppress an increase in connection loss.

Optical module 1 further includes solder resist layer 40 formed on main surface 7a of substrate 7 so as to fill a space between mount portion 20 and measurement reference portion 30. Groove 50 separating mount portion 20 and measurement reference portion 30 is formed in solder resist layer 40. Accordingly; when second lens module 6 disposed in mount portion 20 is fixed using the adhesive, the adhesive preferentially flows into groove 50, and thus it is possible to prevent the adhesive from reaching measurement reference portion 30. Therefore, the mount height of second lens module 6 mounted on mount portion 20 can be more reliably adjusted with high accuracy with reference to measurement reference portion 30. According to optical module 1, it is possible to more reliably suppress an increase in connection loss.

In optical module 1, measurement reference portion 30 may have a circular shape when viewed from a direction perpendicular to main surface 7a of substrate 7, and groove 50 may be formed so as to surround measurement reference portion 30, When the distance is measured using a laser measuring device that emits a circular laser beam, the area of measurement reference portion 30 can be easily brought close to the cross-sectional area of the laser beam. According to optical module 1, measurement reference portion 30 can be easily miniaturized, and thus it is possible to miniaturize the entire module. In addition, the periphery of measurement reference portion 30 is surrounded by groove 50, and thus it is possible to more reliably prevent the adhesive from reaching measurement reference portion 30. According to optical module 1, it is possible to miniaturize the module while suppressing an increase in connection loss.

In optical module 1, second lens module 6 includes a plurality of light incoming/outgoing portions 6a each having an optical axis extending in the X direction on a plane parallel to main surface 7a. The plurality of light incoming/outgoing portions 6a are arranged along the Y direction orthogonal to the X direction on the plane parallel to main surface 7a. In this configuration, first lens module 5 and second lens module 6 can be easily connected to each other so that the optical axis of optical fiber 2 having the optical axis extending in the X direction coincides with the optical axis of second lens module 6. According to optical module 1, it is possible to easily suppress an increase in connection loss when first lens module 5 and the second lens module 6 are connected to each other.

A method of manufacturing optical module 1 according to an embodiment of the present disclosure includes preparing second lens module 6 and substrate 7, forming mount portion 20 for mounting second lens module 6 on main surface 7a of substrate 7, forming at least one measurement reference portion 30 including a reference point that becomes a height reference when measuring the mount height of second lens module 6 on main surface 7a of substrate 7 at a position apart from mount portion 20, and mounting second lens module 6 on mount portion and adjusting the height of second lens module 6 with the height of measurement reference portion 30 being a height reference. Accordingly, it is possible to adjust the height of second lens module 6 providing measurement reference portion 30 aside from mount portion 20 on which second lens module 6 is mounted. According to the method of manufacturing optical module 1, the height position of second lens module 6 can be adjusted with high accuracy after disposing second lens module 6 on substrate 7, and optical module 1 with high mounting accuracy can be obtained.

In the method of manufacturing optical module 1, in the forming mount portion 20, first metal foil layer 21 is formed on main surface 7a of substrate 7, and first metal plating layer 22 is formed on first metal foil layer 21. In the forming measurement reference portion 30, second metal foil layer 31 is formed on main surface 7a of substrate 7, and second metal plating layer 32 is formed on second metal foil layer 31. First metal foil layer 21 and second metal foil layer 31 may be formed in the same process, and first metal plating layer 22 and second metal plating layer 32 may be formed in the same process. Thereby, mount portion 20 and measurement reference portion 30 can be formed through the same processes, and the heights of mount portion 20 and measurement reference portion 30 can be more reliably adjusted to the same. According to the method of manufacturing optical module 1, it is possible to more easily adjust the mount height of second lens module 6 mounted on mount portion 20.

MODIFIED EXAMPLES

Figure 7A:
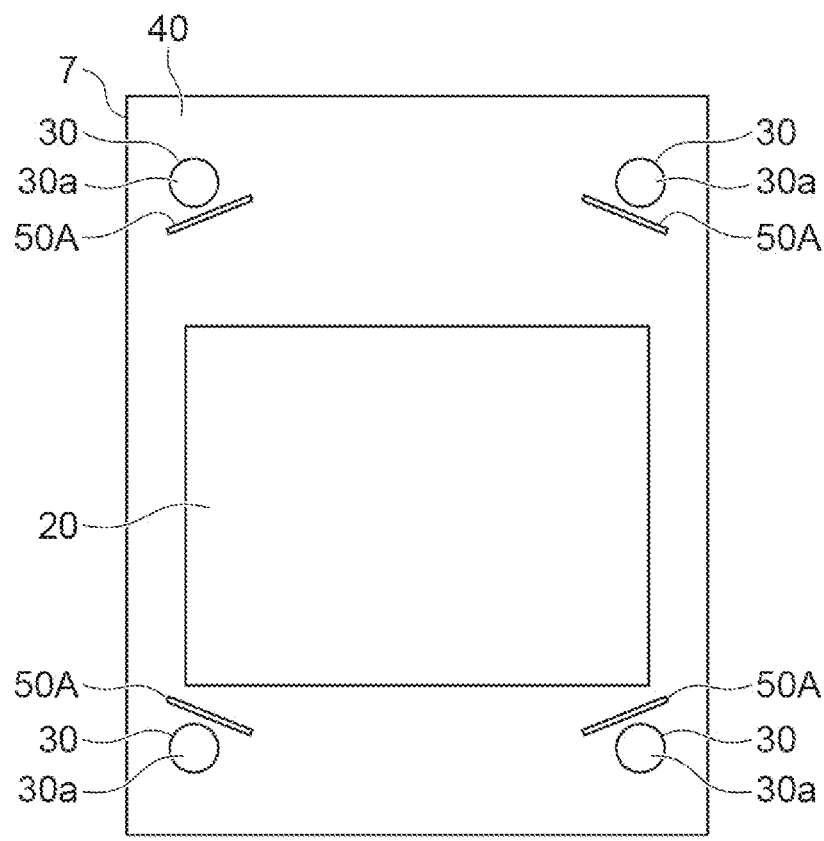
FIG. 7A is a top view showing a modified example of grooves on the substrate shown in FIG. 4, wherein each groove has a linear shape.
Figure 7B:
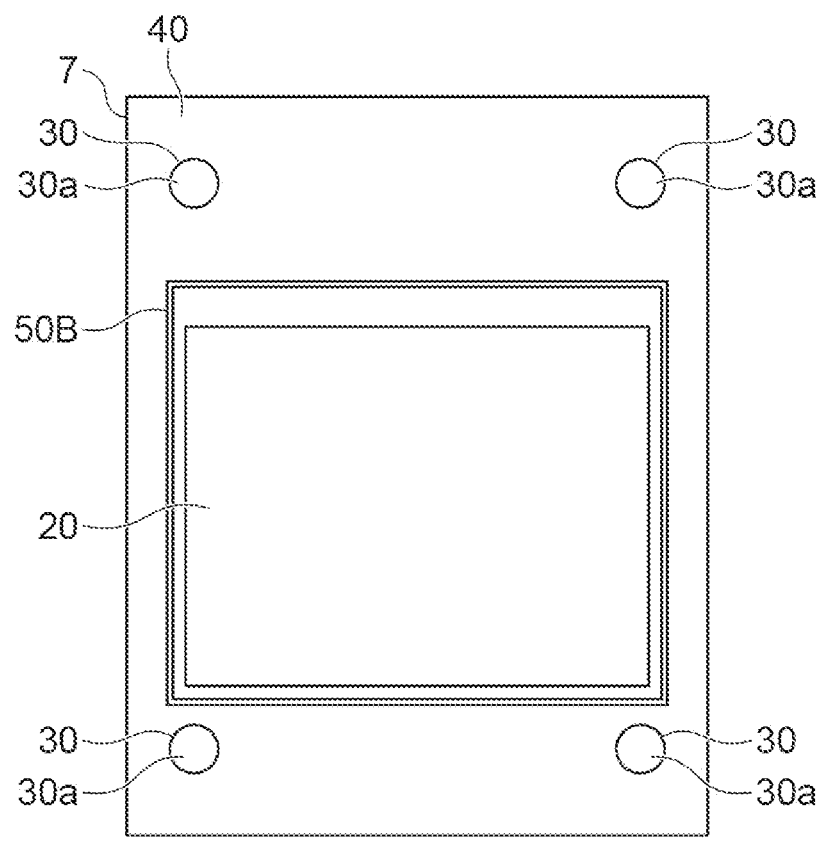
FIG. 7B is a top view showing a modified example of a groove on the substrate shown in FIG. 4, wherein the groove has a rectangular shape surrounding a mount portion.

Here, the modification of groove 50 will be described with reference to FIG. 7A and FIG. 7B. FIG. 7A is a top view showing a modified example of groove 50 (grooves 50A) on substrate 7 shown in FIG. 4, wherein each groove has a linear shape, and FIG. 7B is a top view showing a modified example of groove 50 (groove 50B) on substrate 7 shown in FIG. 4, wherein the groove has a rectangular shape surrounding the mount portion. Hereinafter, points different from groove 50 of optical module 1 according to one embodiment will be mainly described, and the other description may be omitted.

As shown in FIG. 7A, grooves 50A are formed at four positions of solder resist layer 40 so as to separate mount portion 20 and each of measurement reference portions 30 provided at four positions. Each of grooves 50A has a linear shape when viewed from a direction perpendicular to main surface 7a, and extends so as to be inclined with respect to the width direction of substrate 7. As shown in FIG. 7B, groove 50B is formed at one location of solder resist layer 40 so as to separate measurement reference portions 30 and mount portion 20. Groove 50B has a rectangular frame shape surrounding mount portion 20 when viewed from a direction perpendicular to main surface 7a. Also in the optical module including grooves 50A or groove 50B according to such modification, the same effect as that of grooves 50 of the above-described optical module 1 can be obtained. In addition, grooves 50A can be miniaturized by shortening the length of each groove 50A.

Although the embodiments of the present disclosure have been described in detail above, the present invention is not limited to the above-described embodiments and can be applied to various embodiments. For example, although the shapes for groove 50 including the modification are illustrated, groove 50 may have another shape as long as mount portion 20 and measurement reference portion 30 can be separated. Although measurement reference portion 30 made of metal is exemplified, measurement reference portion 30 may be made of other materials as long as the height position can be measured by distance measuring instrument K such as a laser distance measuring instrument. Although four measurement reference portions 30 are provided in the above-described embodiment, at least one measurement reference portion 30 may be provided in order to adjust the mount height of second lens module 6, and the number of measurement reference portions 30 is not particularly limited.

What is claimed is:
1. An optical module comprising:
an optical component;
a substrate including a main surface, the substrate mounting the optical component thereon;
a mount portion provided on the main surface of the substrate, the mount portion being configured to mount the optical component thereon; and
at least one measurement reference portion provided on the main surface of the substrate at a position apart from the mount portion, the measurement reference portion including a reference point that becomes a height reference when measuring a mount height of the optical component.

2. The optical module according to claim 1,
wherein the mount portion includes a mount surface that mounts the optical component thereon, and the measurement reference portion includes a reference surface including the reference point, and
wherein the mount surface and the reference surface have a predetermined positional relationship in a thickness direction of the substrate.

3. The optical module according to claim 2,
wherein the mount surface and the reference surface have a positional relationship in which the mount surface and the reference surface have a same height in the thickness direction of the substrate.

4. The optical module according to claim 2,
wherein the mount portion includes a first metal foil layer formed on the main surface of the substrate, and a first metal plating layer formed on the first metal foil layer,
wherein the measurement reference portion includes a second metal foil layer formed on the main surface of the substrate, and a second metal plating layer formed on the second metal foil layer,
wherein a surface of the first metal plating layer includes the mount surface, and a surface of the second metal plating layer includes the reference surface.

5. The optical module according to claim 1, wherein the measurement reference portion includes a surface made by a metal.

6. The optical module according to claim 1,
wherein the at least one measurement reference portion includes a plurality of measurement reference portions, and
wherein the plurality of measurement reference portions are disposed on the main surface of the substrate so as to surround the mount portion.

7. The optical module according to claim 1,
wherein the at least one measurement reference portion includes a plurality of measurement reference portions, and
wherein the plurality of measurement reference portions are not overlapped with the optical component.

8. The optical module according to claim 1,
wherein the at least one measurement reference portion includes a plurality of measurement reference portions, and
wherein the plurality of measurement reference portions are located adjacent to respective corners of the mount portion.

9. The optical module according to claim 1, further comprising:
a solder resist layer formed on the main surface of the substrate so as to fill a space between the mount portion and the measurement reference portion,
wherein a groove separating the mount portion and the measurement reference portion is formed in the solder resist layer.

10. The optical module according to claim 9, wherein the measurement reference portion has a circular shape when the measurement reference portion is viewed from a direction perpendicular to the main surface of the substrate, and the groove is formed so as to surround the measurement reference portion.

11. The optical module according to claim 9, wherein the groove has a linear shape.

12. The optical module according to claim 9, wherein the groove is formed so as to surround the mount portion.

13. The optical module according to claim 1 further comprising:
a solder resist layer formed on the main surface of the substrate,
wherein the at least one measurement reference portion includes a plurality of measurement reference portions, and
wherein a plurality of grooves respectively separating the mount portion and the plurality of measurement reference portions are formed in the solder resist layer.

14. The optical module according to claim 1, wherein the optical component includes a plurality of light incoming/outgoing portions each having an optical axis extending in a first direction on a plane parallel to the main surface, and the plurality of light incoming/outgoing portions are arranged along a second direction intersecting the first direction on the plane parallel to the main surface.

15. A method of manufacturing an optical module, the method comprising:
preparing an optical component and a substrate;
forming a mount portion to mount the optical component thereon, on a main surface of the substrate;
forming at least one measurement reference portion on the main surface of the substrate at a position apart from the mount portion, the at least one measurement reference portion including a reference point that becomes a height reference when measuring a mount height of the optical component; and
mounting the optical component on the mount portion and adjusting a height of the optical component with a height of the measurement reference portion being the height reference.

16. The method of manufacturing an optical module according to claim 15,
wherein, in the forming of the mount portion, a first metal foil layer is formed on the main surface of the substrate and a first metal plating layer is formed on the first metal foil layer,
wherein, in the forming of the measurement reference portion, a second metal foil layer is formed on the main surface of the substrate and a second metal plating layer is formed on the second metal foil layer,
wherein the first metal layer and the second metal foil layer are formed in a same process, and the first metal plating layer and the second metal plating layer are formed in a same process.

* * * * *